UNITED STATES PATENT OFFICE.

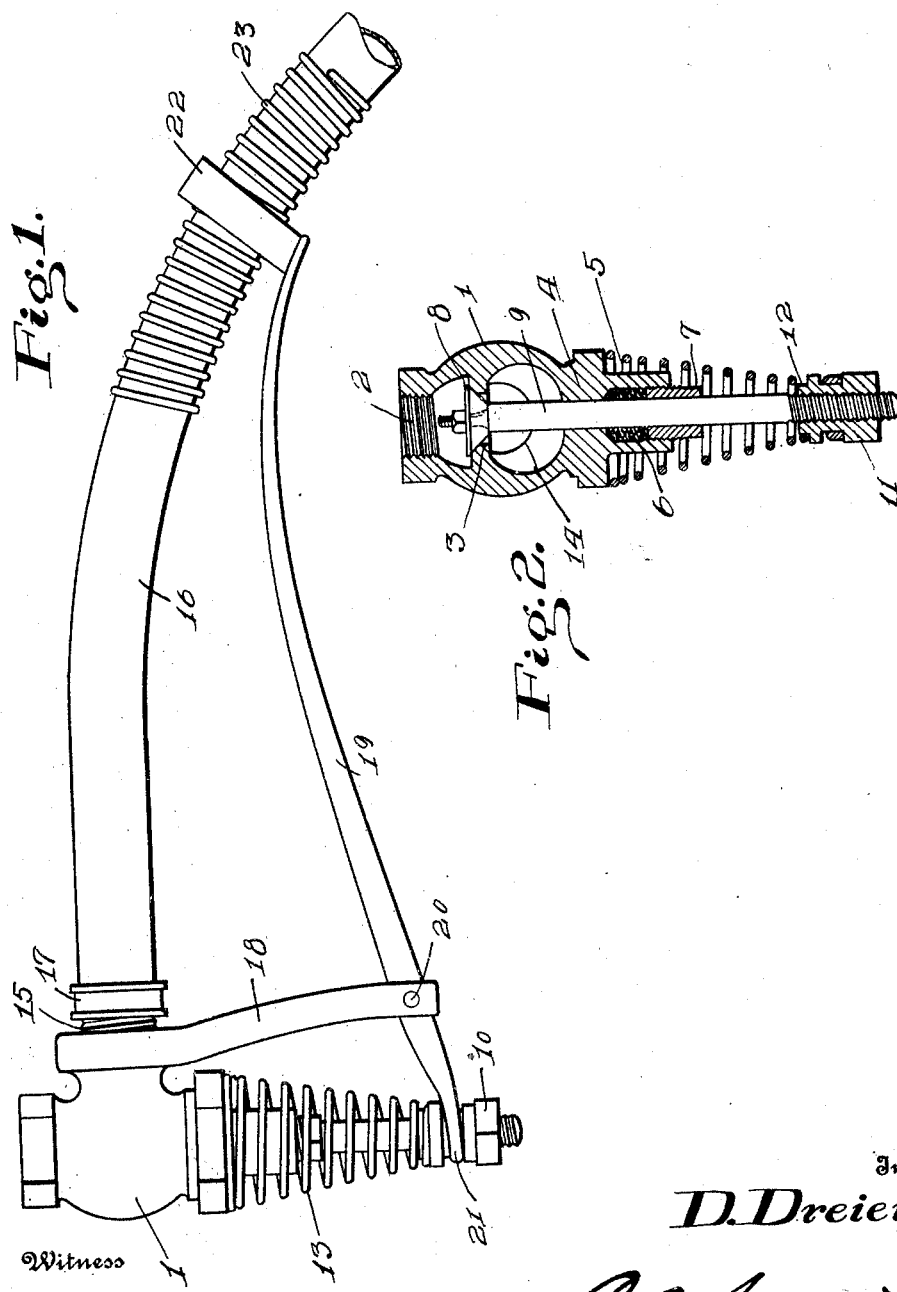

DOMINICK DREIER, OF LIVINGSTON, MONTANA.

VALVE.

1,372,125.        Specification of Letters Patent.        Patented Mar. 22, 1921.

Application filed April 12, 1920. Serial No. 373,350.

*To all whom it may concern:*

Be it known that I, DOMINICK DREIER, a citizen of the United States, residing at Livingston, in the county of Park and State of Montana, have invented a new and useful Valve, of which the following is a specification.

The device forming the subject matter of this application is adapted to be employed in garages and elsewhere, and aims to provide a novel means whereby a valve, controlling the passage of a liquid, may be opened by a pull on a hose through which the liquid is dispensed.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; and Fig. 2 is a longitudinal section taken through the valve casing and attendant parts.

The numeral 1 denotes a casing having an end opening 2 and supplied intermediate its ends with a valve seat 3. One end portion 4 of the casing 1 is provided with a neck 5 containing a packing 6 compressed by a screw plug 7 threaded into the neck 5, the packing and the plug 7 constituting, obviously, a gland.

A valve 8 coöperates with the seat 3 and is carried by a stem 9 mounted to slide in the gland 6—7 and in the end portion 4 of the casing 1. A nut 10 is threaded on the exposed end of the valve stem 9 and is provided with a circumscribing groove 11, the nut being supplied at its inner end with a reduced neck 12. A helical compression spring 13, preferably of conical form, abuts at its ends against the end 4 of the casing 1 and against the nut 10, one end of the spring surrounding the neck 5 of the valve casing and the other end of the spring surrounding the neck 12 of the nut 10. The nut 10 constitutes means for adjusting the compressive effort of the spring 13.

The casing 1 has a side opening 14, communicating with a nipple 15. The numeral 16 denotes a flexible tube or hose connected by a coupling 17 with the nipple 15. The casing 1 is supplied with an arm 18 extended approximately parallel to the stem 9 of the valve 8. The numeral 19 denotes a lever fulcrumed intermediate its ends, as shown at 20, on the arm 18. One extremity of the lever 19 is provided with a fork 21 received in the groove 11 of the nut 10. The opposite end of the lever 19 is equipped with an annular eye through which the hose 16 extends, that portion of the hose which is located in the eye being provided with a guard 23, which may be a spring.

In practical operation, by pulling downwardly on the hose 16, the lever 19 is tilted on its fulcrum 20, the valve stem 9 and the valve 8 being raised. Liquid then can pass into the casing by way of the opening 2 and leave the casing by way of the opening 14 and the hose 16. As soon as the pull on the hose 16 is released, the spring 13 will react, thereby closing the valve 8 and elevating that end of the lever 19 which is provided with the eye 22. The compressive effort of the spring 13 may be regulated by adjusting the nut 10 on the stem 9 of the valve 8, such an adjustment being brought about that the valve 8 may be opened when a slight pull is exerted on the hose 16.

Having thus described the invention, what is claimed is:—

1. In a device of the class described, a casing; a valve operating in the casing and including a stem; spring means for closing the valve; a flexible tube connected with the casing; a lever provided at one end with means for holding the tube; means for fulcruming the lever intermediate its ends on the casing; and means for connecting the other end of the lever with the stem of the valve, said last specified means coöperating with the spring means to adjust the latter.

2. In a device of the class described, a casing; a valve operating in the casing and including a stem; spring means for closing the valve; a lever and means for fulcruming the lever intermediate its ends on the casing, one end of the lever coöperating with the stem; a flexible tube of greater length than the lever; a coupling device connecting the tube with the valve, the tube forming a continuous conduit independent of the lever, for conveying fluid from the valve, the lever constituting the sole means, aside from the coupling device, for supporting and guiding the tube; and means on the other end of the lever for holding the tube.

In testimony that I claim the foregoing as my own, I have hereto affixed my signature in the presence of two witnesses.

DOMINICK DREIER.

Witnesses:
 WALTER D. STYERS,
 ALBERT E. DAWES.